(12) United States Patent
Bulea et al.

(10) Patent No.: US 9,958,994 B2
(45) Date of Patent: May 1, 2018

(54) SHEAR FORCE DETECTION USING CAPACITIVE SENSORS

(71) Applicant: Synaptics Incorporated, San Jose, CA (US)

(72) Inventors: Mihai Bulea, Santa Clara, CA (US); Scott Shaw, Fremont, CA (US); Adam Schwartz, Redwood City, CA (US)

(73) Assignee: Synaptics Incorporated, San Jose, CA (US)

( * ) Notice: Subject to any disclaimer, the term of this patent is extended or adjusted under 35 U.S.C. 154(b) by 267 days.

(21) Appl. No.: 14/952,560

(22) Filed: Nov. 25, 2015

(65) Prior Publication Data

US 2016/0077638 A1 Mar. 17, 2016

Related U.S. Application Data

(63) Continuation of application No. 13/827,138, filed on Mar. 14, 2013, now Pat. No. 9,229,592.

(51) Int. Cl.
*G09G 5/00* (2006.01)
*G06F 3/044* (2006.01)
*G06F 3/041* (2006.01)

(52) U.S. Cl.
CPC ............ *G06F 3/044* (2013.01); *G06F 3/0414* (2013.01); *G06F 2203/04106* (2013.01)

(58) Field of Classification Search
CPC .................. G06F 3/044; G06F 3/0414; G06F 2203/04106; H01L 23/5223; H01L 23/5222
USPC ............ 345/156, 173, 174; 178/18.01–18.07
See application file for complete search history.

(56) References Cited

U.S. PATENT DOCUMENTS

| 4,290,052 | A | 9/1981 | Eichelberger et al. |
| 4,347,478 | A | 8/1982 | Heerens et al. |
| 4,719,538 | A | 1/1988 | Cox |
| 5,492,020 | A | 2/1996 | Okada |
| 5,510,813 | A | 4/1996 | Makinwa et al. |
| 5,854,625 | A | 12/1998 | Frisch et al. |
| 5,942,733 | A | 8/1999 | Allen et al. |

(Continued)

FOREIGN PATENT DOCUMENTS

| JP | 2009009249 A | 1/2009 |
| KR | 20100114283 A | 10/2010 |

(Continued)

OTHER PUBLICATIONS

International Preliminary Report on Patentability issued in PCT/US2014/024122 dated Sep. 24, 2015 (14 pages).

(Continued)

*Primary Examiner* — Rodney Amadiz
(74) *Attorney, Agent, or Firm* — FBFK PC

(57) ABSTRACT

An input device having a sensing region overlapping an input surface includes a first substrate, a second substrate physically coupled to the first substrate, and a sensor electrode disposed on the first substrate and configured to detect input objects in the sensing region. A first force sensor includes a first electrode disposed on the first substrate and a first conductive portion of the second substrate capacitively coupled with the first electrode. The first conductive portion is configured to move relative to the first electrode such that a first variable capacitance of the first force sensor changes in response to force applied to the input surface in a first direction parallel to the touch surface.

20 Claims, 7 Drawing Sheets

(56) References Cited

U.S. PATENT DOCUMENTS

| | | |
|---|---|---|
| 5,945,980 A | 8/1999 | Moissev et al. |
| 5,973,668 A | 10/1999 | Watanabe |
| 6,002,389 A | 12/1999 | Kasser |
| 6,215,476 B1 | 4/2001 | Depew et al. |
| 6,492,979 B1 | 12/2002 | Kent et al. |
| 6,504,530 B1 | 1/2003 | Wilson et al. |
| 6,642,857 B1 | 11/2003 | Schediwy et al. |
| 6,888,537 B2 | 5/2005 | Benson et al. |
| 7,148,882 B2 | 12/2006 | Kamrath et al. |
| 7,451,659 B2 | 11/2008 | Dallenbach et al. |
| 7,728,487 B2 | 6/2010 | Adachi et al. |
| 7,903,091 B2 | 3/2011 | Lee et al. |
| 8,847,355 B2 | 9/2014 | Chung |
| 2002/0019711 A1 | 2/2002 | Miyashita et al. |
| 2002/0122025 A1 | 9/2002 | Suzuki et al. |
| 2002/0180710 A1 | 12/2002 | Roberts |
| 2003/0085882 A1 | 5/2003 | Lu |
| 2003/0214486 A1 | 11/2003 | Roberts |
| 2004/0227736 A1 | 11/2004 | Kamrath et al. |
| 2005/0052425 A1 | 3/2005 | Ladesky et al. |
| 2005/0057528 A1 | 3/2005 | Kleen |
| 2005/0061082 A1 | 3/2005 | Dallenbach et al. |
| 2006/0244733 A1 | 11/2006 | Geaghan |
| 2006/0284856 A1 | 12/2006 | Soss |
| 2007/0063982 A1 | 3/2007 | Tran |
| 2007/0229464 A1 | 10/2007 | Hotelling et al. |
| 2007/0236450 A1 | 10/2007 | Colgate et al. |
| 2008/0018608 A1 | 1/2008 | Serban et al. |
| 2008/0018611 A1 | 1/2008 | Serban et al. |
| 2008/0030482 A1 | 2/2008 | Elwell et al. |
| 2008/0068348 A1 | 3/2008 | Rosenberg et al. |
| 2008/0190210 A1 | 8/2008 | Harish et al. |
| 2008/0202251 A1 | 8/2008 | Serban et al. |
| 2008/0202824 A1 | 8/2008 | Philipp et al. |
| 2008/0238884 A1 | 10/2008 | Harish |
| 2009/0160763 A1 | 6/2009 | Cauwels et al. |
| 2009/0201261 A1 | 8/2009 | Day |
| 2009/0243817 A1 | 10/2009 | Son |
| 2009/0244017 A1 | 10/2009 | Pala et al. |
| 2009/0256807 A1 | 10/2009 | Nurmi |
| 2009/0267892 A1 | 10/2009 | Faubert |
| 2010/0018889 A1 | 1/2010 | Korpanty et al. |
| 2010/0024573 A1 | 2/2010 | Daverman et al. |
| 2010/0090813 A1 | 4/2010 | Je et al. |
| 2010/0149128 A1 | 6/2010 | No et al. |
| 2010/0244628 A1 | 9/2010 | Nishigaki et al. |
| 2010/0250071 A1 | 9/2010 | Pala et al. |
| 2011/0005845 A1 | 1/2011 | Hotelling et al. |
| 2011/0025631 A1 | 2/2011 | Han |
| 2011/0141053 A1 | 6/2011 | Bulea et al. |
| 2011/0175844 A1 | 7/2011 | Berggren |
| 2011/0278078 A1 | 11/2011 | Schediwy et al. |
| 2012/0086648 A1 | 4/2012 | Leung |
| 2012/0105358 A1 | 5/2012 | Momeyer et al. |

FOREIGN PATENT DOCUMENTS

| | | |
|---|---|---|
| WO | 9718528 A1 | 5/1997 |
| WO | 2005121729 A1 | 12/2005 |
| WO | 2007098171 A2 | 8/2007 |
| WO | 2009157614 A1 | 12/2009 |

OTHER PUBLICATIONS

International Search Report PCT/US2010/029823, dated Nov. 19, 2010 (4 pages).

International Search Report Issued in counterpart International Patent Application No. PCT/US2011/034261, dated Feb. 8, 2012 (3 pages).

Office Action issued in corresponding related U.S. Appl. No. 12/418,433, dated Feb. 3, 2012 (31 pages).

Preliminary Report on Patentability issued in counterpart International Patent Application No. PCT/US2011/034261, dated Nov. 22, 2012 (7 pages).

International Search Report and Written Opinion issued in counterpart International Patent Application No. PCT/US2012/034540, dated Nov. 30, 2012 (3 pages).

International Seasrch Report and Written Opinion issued in counterpart International Patent Application No. PCT/US2012/052909, dated Dec. 26, 2012 (9 pages).

Office Action issued in corresponding related U.S. Appl. No. 12/418,433, dated Jan. 7, 2013 (19 pages).

International Search Report and Written Opinion issued in counterpart International Patent Application No. PCT/US2012/060500, dated Jan. 2, 2013 (3 pages).

Office Action issued in corresponding related U.S. Appl. No. 12/418,433, dated Jul. 19, 2013 (34 pages).

Bill Buxton et al.; "Multi-Touch Systems That I have Known and Loved" Microsoft Research; http://www.billbuxton.com/multitouchOverview.html, Jan. 12, 2007 (22 pages).

International Search Report issued in corresponding International Patent Application No. PCT/US2010/060090, dated Aug. 30, 2011 (3 pages).

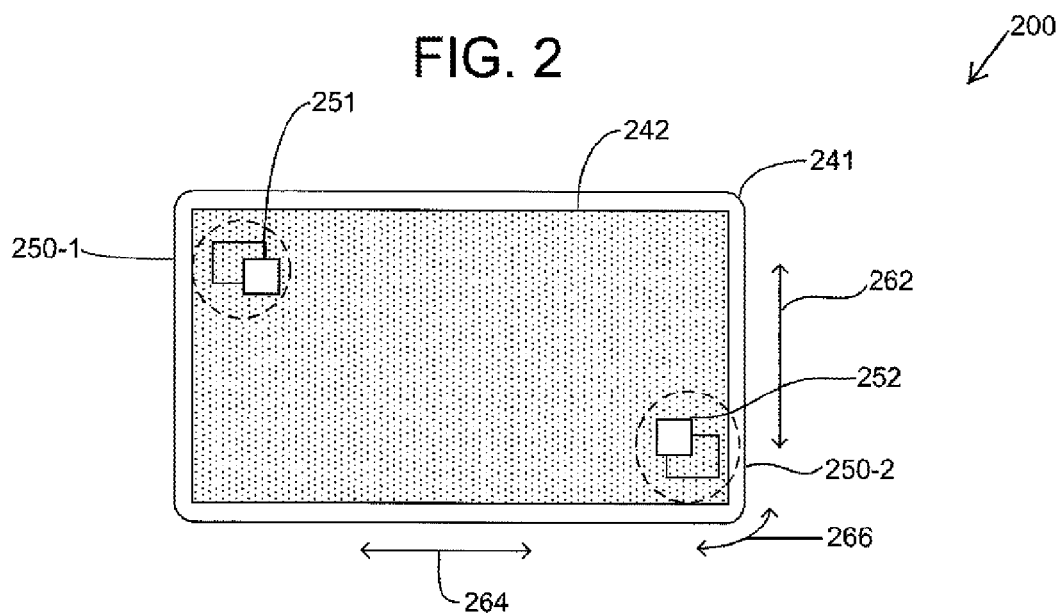
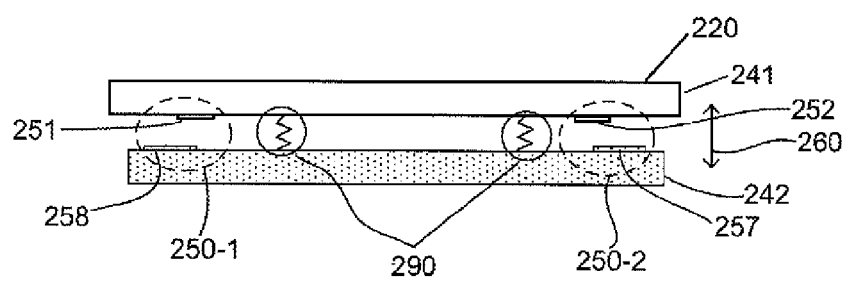

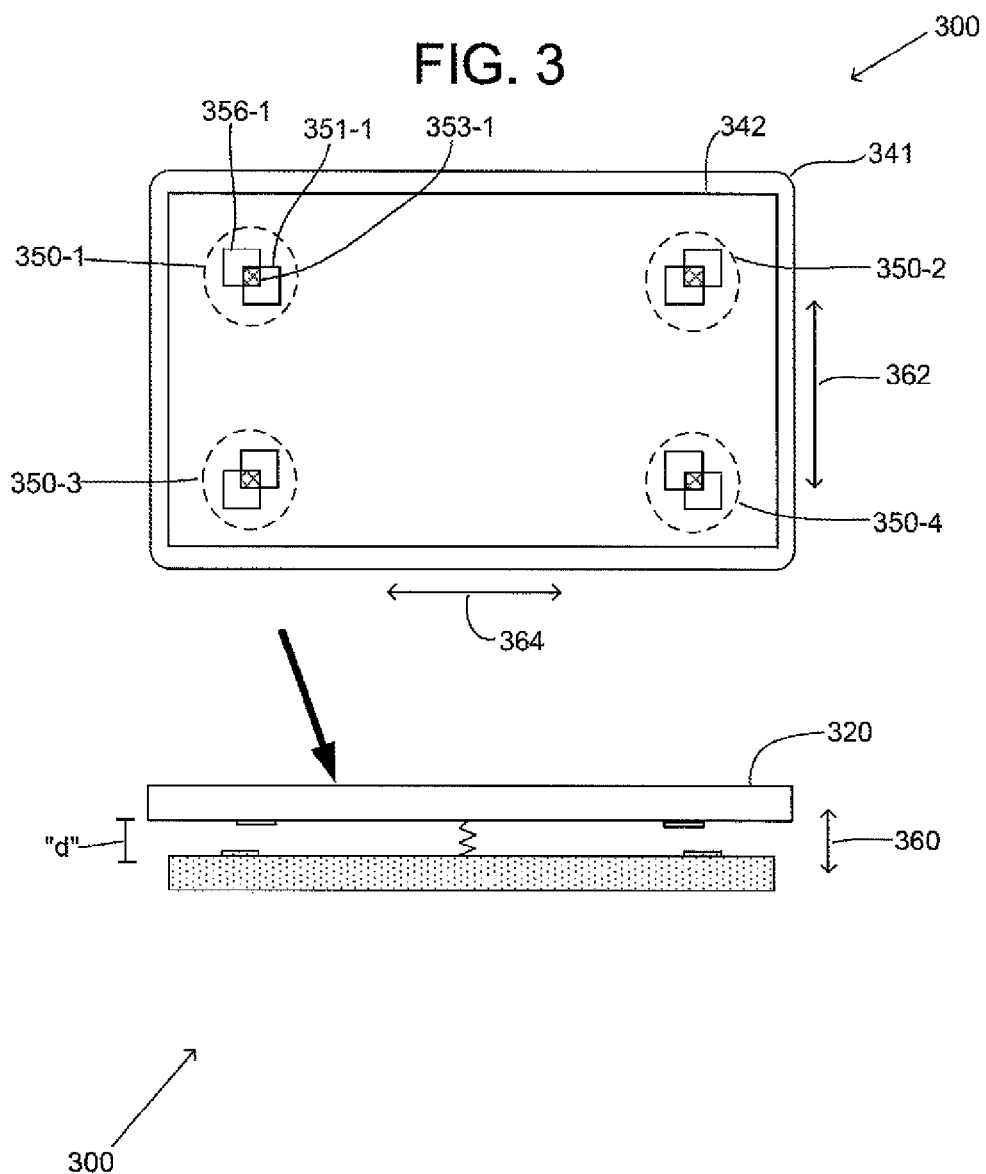

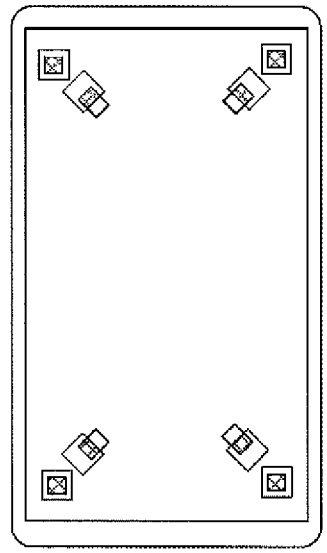
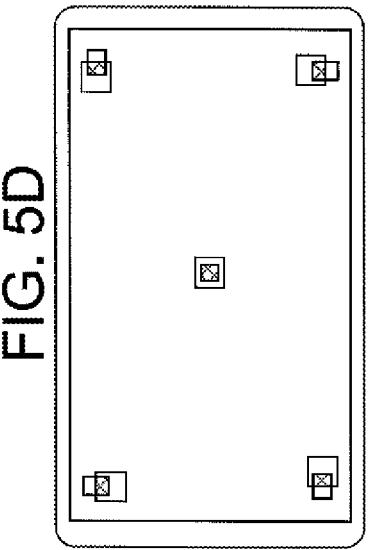
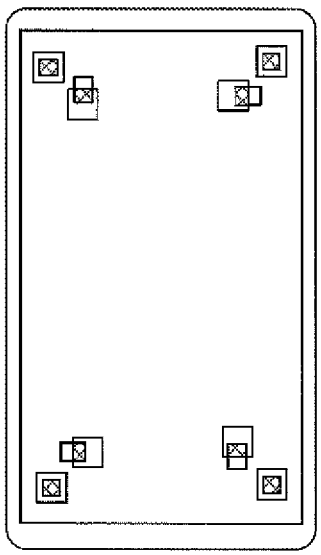
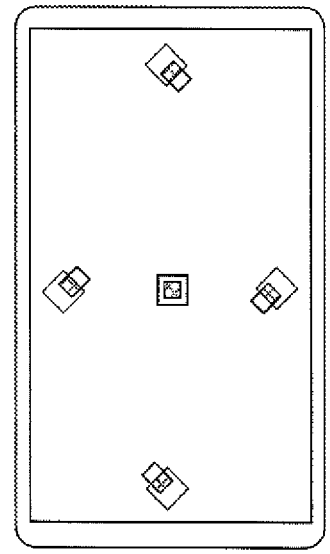

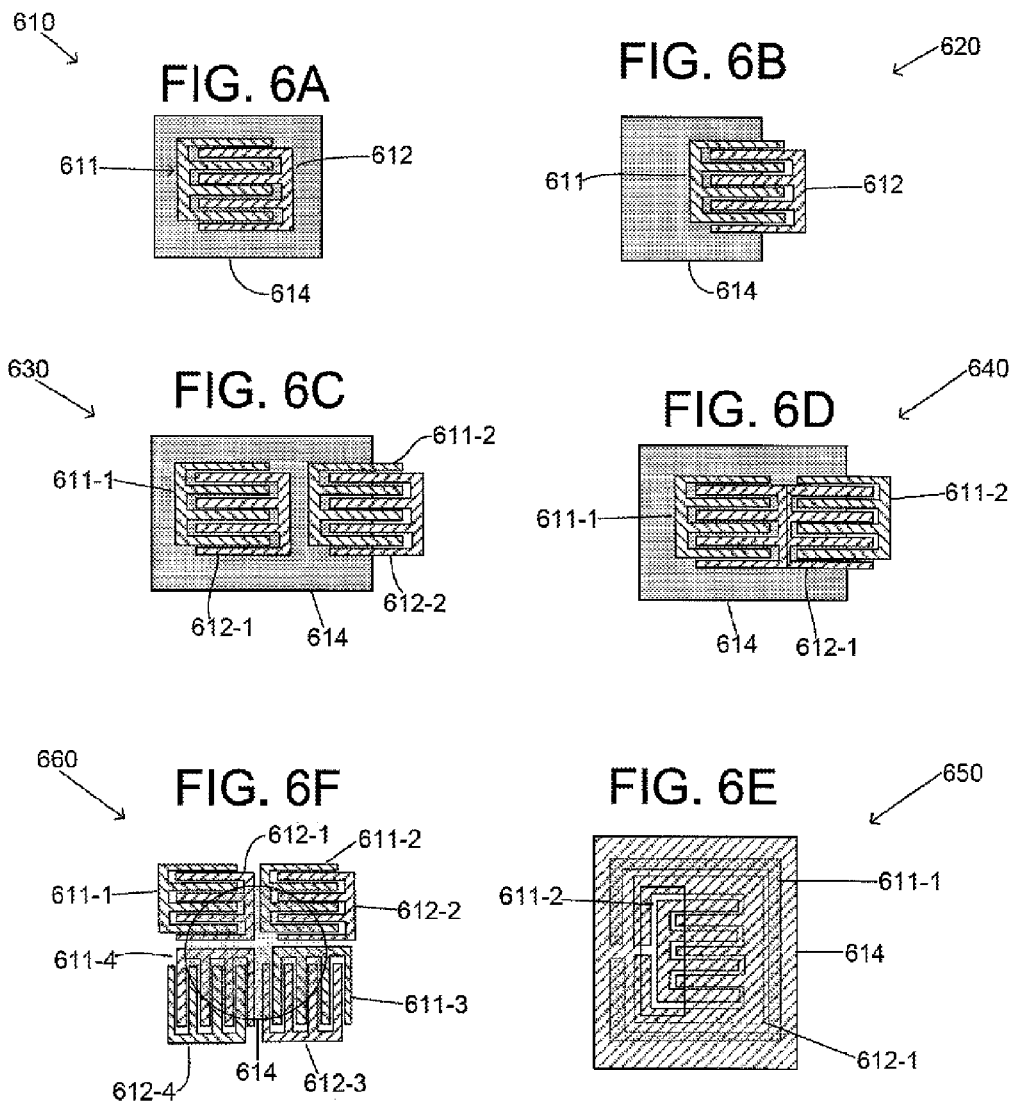

SHEAR FORCE DETECTION USING CAPACITIVE SENSORS

CROSS-REFERENCE TO RELATED APPLICATION

The present application is a continuation application of and, thereby, claims benefit under 35 U.S.C. § 120 to U.S. application Ser. No. 13/827,135, entitled, "SHEAR FORCE DETECTING USING CAPACITIVE SENSORS," filed on Mar. 14, 2013, and incorporated herein by reference.

FIELD OF THE INVENTION

This invention generally relates to electronic devices, and more particularly to input devices configured to detect shear forces.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

The proximity sensor device can be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device can be integral or peripheral to the computing system with which it interacts.

Presently known proximity sensors have the ability to detect and determine force applied to a surface of the sensor, for example, by providing one or more force sensors coupled to the surface of the sensor, such as strain gauge load cells, piezoelectric crystal force transducers, and the like. It is also known to estimate applied force by measuring the increased capacitance resulting from the increased contact area when a finger is pressed against the surface. Drawbacks associated with estimating applied force using these techniques include limited accuracy and complex construction. Consequently, such sensors have are limited in their ability to use such determined force as a basis for determining user input. This limits the flexibility of the proximity sensor device to function as an input device. Thus, there exists a need for improvements in proximity sensor devices, and in particular, in the ability of proximity sensor devices to determine and respond to indications of applied force.

Other desirable features and characteristics will become apparent from the subsequent detailed description and the appended claims, taken in conjunction with the accompanying drawings and the foregoing technical field and background.

BRIEF SUMMARY OF THE INVENTION

Devices and methods are provided that facilitate improved input device performance. An input device utilizes at least one sensor electrode disposed on a first substrate to sense input objects in a sensing region of the device. The first substrate is physically coupled to a second substrate and configured to translate in response to a force applied to the input surface. A plurality of force sensor electrodes are disposed on the first substrate such that they overlap conductive portions of the second substrate and form variable capacitances with the conductive portions. A force applied to the input surface resulting in a translation of the first substrate relative to the second substrate changes the distance between (and/or the area of overlap between) the plurality of force sensor electrodes and the conductive portions of the second substrate. Each force sensor of the plurality of force sensors may be configured to measure a normal and/or planar translation of the first substrate relative to the second substrate.

Input devices according to the present invention exhibit an improved ability to determine the tangential, normal and/or rotational components of force applied to the surface of the sensor. A measurement of the variety of forces applied to the input surface may be used to provide increased input functionality for the user.

BRIEF DESCRIPTION OF DRAWINGS

The preferred exemplary embodiment of the present invention will hereinafter be described in conjunction with the appended drawings, where like designations denote like elements, and:

FIG. 2 illustrates a top and a profile view of an input device in accordance with an embodiment of the invention;

FIG. 3 illustrates a top and a profile view of an input device in accordance with an embodiment of the invention;

FIGS. 5A-5D illustrate respective top views of an input device in accordance with an embodiment of the invention;

FIGS. 6A-6F illustrate various alternate embodiments of force sensors configured to detect deflection of the first substrate relative to the second substrate in accordance with an embodiment of the invention.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Figure 1:
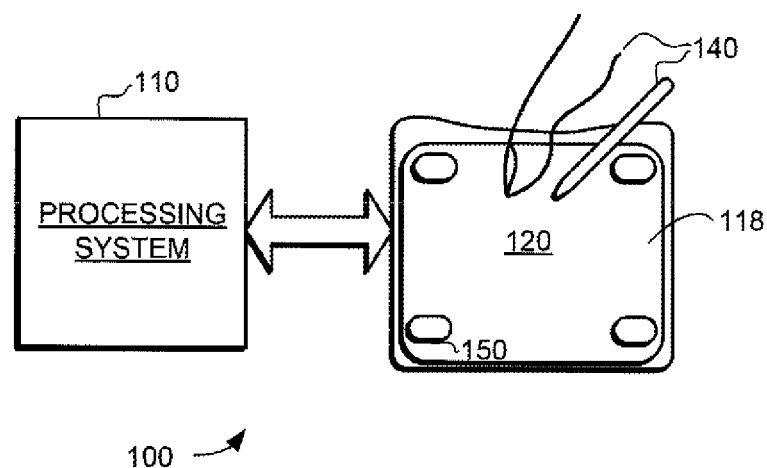
FIG. 1 is a block diagram of an exemplary system that includes an input device in accordance with an embodiment of the invention.

Turning now to the figures, FIG. 1 is a block diagram of an exemplary input device 100, in accordance with embodiments of the invention, which combines a proximity sensor with a plurality of force sensors. The input device 100 uses both the proximity sensor and the force sensors to provide an interface for the electronic system. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1. The input device 100 has a processing system 110, a sensing region 120 having an input surface 118, and four force sensors 150 implemented proximate the sensing region. As will be described in greater detail below, each of the force sensors 150 may be implemented with any of the various embodiments of force sensors described below. Furthermore, it should be noted that while the force sensors 150 are illustrated as being outside the input surface 118, in other embodiments one or more force sensors may be provided within the perimeter of the input surface 118. Likewise, it should be noted that while FIG. 1 shows four force sensors 150 disposed near the corners of the input surface 118, that in other embodiments described below, more of fewer force sensors may be provided and may be disposed on various arrangements with respect to the input surface 118. Not shown in FIG. 1 is an array of sensing electrodes that are adapted to capacitively sense objects in the sensing region 120.

The input device 100 is adapted to provide user interface functionality by facilitating data entry responsive to sensed input objects and the force applied by such objects. Specifically, the processing system 110 is configured to determine positional information for objects interacting with the sensing region 120. This positional information can then be used by the electronic system to provide a wide range of user interface functionality.

Furthermore, the processing system 110 is configured to determine force information for input objects from measures of force determined by the force sensors 150. This force information can then also be used by the electronic system to provide a wide range of user interface functionality. For example, by providing different user interface functions in response to different levels/direction of applied force by input objects in the sensing region.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). in some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each object as a vector or scalar quantity. Specifically, force information may comprise normal, tangential and rotational force applied to the input surface. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, GUI navigation and other functions.

In some embodiments, the input device 100 is implemented with additional input components that are operated by the processing system 110 or by some other processing system. These additional input components may provide redundant functionality for input in the sensing region 120, or some other functionality. While not shown in FIG. 1, buttons near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

As noted above, the input device 100 may be implemented with a variety of different types and arrangements of capacitive sensing electrodes. To name several examples, the capacitive sensing device may be implemented with electrode arrays that are formed on multiple substrate layers, including parts of the same layers used to form the force sensors. As one specific embodiment, electrodes for sensing in one direction (e.g., the "X" direction) may formed on a first layer (e.g., on a first side of a first substrate or any other suitable substrate), while the electrodes for sensing in a second direction (e.g., the "Y" direction are formed on a second layer (e.g., on another side of the first substrate or any other suitable substrate).

In other embodiments, the electrodes for both the X and Y sensing may be formed on the same layer, with that same layer comprising any of the substrates described in below. In yet other embodiments, the electrodes may be arranged for sensing in only one direction, e.g., in either the X or the Y direction. In still another embodiment, the electrodes may be arranged to provide positional information in polar coordinates, such as "r" and "θ" as one example. In these embodiments the electrodes themselves are commonly arranged in a circle or other looped shape to provide "θ", with the shapes of individual electrodes used to provide "r". Also, a variety of different electrode shapes may be used, including electrodes shaped as thin lines, rectangles, diamonds, wedge, etc. Finally, a variety of conductive materials and fabrication techniques may be used to form the electrodes. As one example, the electrodes are formed by the deposition and etching of copper or ITO on a substrate.

Turning now to FIG. 2, top and profile views of input device 200 are illustrated. The input device is implemented with a first substrate 241, a second substrate 242 and two force sensors 250-1 and 250-2. The first substrate 241 is physically coupled to the second substrate 242 and configured to move relative to the second substrate 242 in response to a force applied to an input surface 220. The input device is also configured to sense input objects in a sensing region (sensing region not shown), for example, using capacitive sensing electrodes disposed on the first substrate 242.

The first substrate 241 is configured to move relative to the second substrate 242 in multiple directions and/or dimensions. A force applied to the input surface 220 can move the first substrate 241 in a first direction having a component along arrow 262, and in a second direction having a component along arrow 264. For example, movement of the first substrate 241 relative to the second substrate 242 in a first direction 262 occurs in response to a force applied in a first direction parallel to the input surface 220. Likewise, a force applied in a second direction parallel to the input surface 220 results in movement of the first substrate 241 in a second direction 264. A force applied to the input surface 220 which has a force component directed along both the first and second directions will result in a combination of movement along both the first and second directions 262 and 264. Furthermore, a force applied in a direction perpendicular to the input surface 220 results in a movement of the first substrate 241 in an orthogonal direction 260 with respect to the second substrate 242.

In the illustrated embodiment, the first and second substrates are physically coupled via springs 290. However, this is just one example of a coupling mechanism which may be used to allow the first substrate 241 to move relative to substrate 242 in the first and/or second directions 262 and 264. Various methods for coupling the first and second substrate, which allow for movement in the first and/or second directions, are possible and contemplated by the present disclosure. For example, the first and second substrate may be physically coupled with an adhesive or a mechanical linkage.

In the embodiment of FIG. 2, first and second force sensors 250-1 and 250-2 are shown. Force sensor 250-1 includes a first force sensor electrode 251, and force sensor 250-2 includes a first force sensor electrode 252, both first force sensor electrodes being disposed on the first substrate 241. Force sensors 250-1 and 250-2 also include a conductive portion of the second substrate, illustrated as items 256 and 257, which are capacitively coupled to the first force sensor electrode 251 and second force sensor electrode 252, respectively. Thus, the first force sensor electrode 251 and the first conducive portion 256 form a first variable capacitance (not shown), and the second force sensor electrode 252 and the second conductive portion 257 form a second variable capacitance (not shown).

Movement of the first substrate 241, in response to a force applied to the input surface 220, results in a change of at least one of the first and second variable capacitances 256 and 257. A measurement of the changes in the variable capacitances is used to determine the force applied to the input surface 220. For example, movement of the first substrate 241 relative to the second substrate 242 in a first direction 262 changes the first and second variable capacitances 256 and 257 differently based on the direction of movement along the first direction 262. Movement in an upwards direction along the first direction 262 will increase the variable capacitance of the first force sensor 250-1 and decrease the variable capacitance of the second force sensor 250-2. Conversely, movement in a downwards direction along the first direction 262 will decrease the variable capacitance of the first force sensor 250-1 and increase the variable capacitance of the second force sensor 250-2.

The change in the variable capacitances is determined, in part, by a change in the distance and/or area of overlap between the force sensor electrodes and the conductive portions of each force sensor 250-1 and 250-2. A measurement of the variable capacitance(s) of each force sensor can thus be used to determine force information for the object(s) applying force to the input surface 220. In some implementations, a variable capacitance of a force sensor can have a relatively linear response to force. That is, as force is applied to the input surface resulting in movement of the first substrate 241 relative to the second substrate 242, the resulting change in capacitance is a function of the amount of relative movement between first substrate 241 and the second substrate 242. Likewise, the amount of movement may also be a function of the force applied to the input surface 220. With the appropriate selection of materials and geometries for the force sensors 250-1 and 250-2, the input device 200 may provide an accurate and useful measure of applied force. A more detailed example is described in the embodiment of FIG. 3.

As will be described in greater detail below, a measurement of the variable capacitance formed by each force sensor may comprise an absolute or "self-capacitive" measurement. In such an embodiment, a force sensor electrode is modulated with respect to a reference voltage and a change in capacitive coupling between the force sensor electrode and a conductive object (e.g. a conductive portion such as variable capacitances 256 and 257) is indicative of the movement of the force sensor electrode relative to the conductive object. In other embodiments, a measurement of the variable capacitance formed by each force sensor may comprise a mutual capacitance or "trans-capacitive" measurement. In such an embodiment, at least two force sensor electrodes of a force sensor form a capacitive coupling between each other and the presence of a conductive object (e.g. a conductive portion like 256 and 257) can change the magnitude of the capacitive coupling.

In various embodiments of the present invention a force sensor comprises a conductive portion disposed on a second substrate (e.g., conductive portions 256 and 257 in FIG. 2) which at least partially overlaps the force sensor electrodes of each force sensor. A displacement and/or translation of the conductive portion of each force sensor changes (i) an area of overlap and/or (ii) a spacing between the force sensor electrodes and the conductive portion. As will be described in greater detail with reference to FIG. 7, a conductive portion affixed to a non-conductive second substrate may be functionally equivalent to a non-conductive portion of a conductive second substrate. For example, with reference to FIG. 2, in another embodiment the second substrate 242 may be conductive and "conductive portions" 256 and 257 may be non-conductive. Such an arrangement is functionally equivalent for the purposes of force sensing, since the change in capacitive coupling between the force sensor electrode(s) disposed on the first substrate and a conductive material on the second substrate is functionally equivalent to the coupling to a conductive second substrate having a non-conductive portion at least partially overlapping the force sensor electrodes.

Turning now to FIG. 3, top and profile views of input device 300 are illustrated. The input device is implemented with a first substrate 341 coupled to and moveable relative to a second substrate 342. A force applied to the input surface 320 can move the first substrate 341 in a first direction 362, a second direction 364 and/or a third direction 360. Specifically, a normal force component applied to the input surface 320 will result in movement along the third direction 360 and a tangential force component applied to the input surface 320 will result in movement along the first and/or second direction 362 and 364.

The input device 300 is also implemented with four force sensors 350-1, 350-2, 350-3 and 350-4. Each force sensor comprises a first force sensor electrode which is capacitively coupled to a first conductive portion of the second substrate. This is illustrated in FIG. 3 for the first force sensor 350-1 which comprises a first sensor electrode 351-1 capacitively coupled to a first conductive portion 356-1 of the second substrate 342. Also, an area of overlap 353-1 between the first sensor electrode 351-1 and the first conductive portion 356-1 is shown. For clarity of illustration, force sensors 350-2, 350-3 and 350-4 have a similar arrangement which is not specifically enumerated in FIG. 3.

A variable capacitance of each force sensor can be measured based on the movement of the first substrate relative to the second substrate, the distance separating a force sensor electrode from a conductive portion, and the area of overlap between a force sensor electrode and a conductive portion. In the embodiment of FIG. 3, the first and second substrates are separated by a distance "d" and a dielectric (e.g., air). For simplicity, each force sensing electrode and conductive portion are taken to be square, and the area of overlap (as exemplified by the area of overlap 353-1) is thus: $A = l * l = l^2$. The capacitive coupling between each force sensor electrode and conductive portion may be modeled by Equations 1a-d as:

$$C_{350\text{-}1}(\delta_x, \delta_y, \delta_z) \approx \frac{\varepsilon(A + l(-\delta_x + \delta_y))}{d - \delta_z} \quad \text{(Eq. 1a)}$$

-continued $$C_{350-2}(\delta_x, \delta_y, \delta_z) \approx \frac{\varepsilon(A + l(\delta_x + \delta_y))}{d - \delta_z} \quad \text{(Eq. 1b)}$$

$$C_{350-3}(\delta_x, \delta_y, \delta_z) \approx \frac{\varepsilon(A + l(-\delta_x - \delta_y))}{d - \delta_z} \quad \text{(Eq. 1c)}$$

$$C_{350-4}(\delta_x, \delta_y, \delta_z) \approx \frac{\varepsilon(A + l(\delta_x - \delta_y))}{d - \delta_z} \quad \text{(Eq. 1d)}$$

where movement of the first substrate along the first direction 362 is defined as $\delta_y$, movement along the second direction 364 is defined as $\delta_x$ and movement along the third direction 360 is defined as $\delta_z$. The capacitive coupling varies in response to displacements in the first, second and/or third directions (362, 364, 360). If the second order term of $\delta_y * \delta_x$ is ignored, the variable capacitances may be modeled by Equations 2a-d as:

$$\Delta C_{350-1}(\delta_x, \delta_y, \delta_z) \approx \quad \text{(Eq. 2a)}$$
$$\frac{\varepsilon}{d - \delta_z}\left(A\frac{\delta_z}{d} + l(-\delta_x + \delta_y)\right) \approx \frac{\varepsilon}{d}\left(A\frac{\delta_z}{d} + l(-\delta_x + \delta_y)\right)$$

$$\Delta C_{350-2}(\delta_x, \delta_y, \delta_z) \approx \quad \text{(Eq. 2b)}$$
$$\frac{\varepsilon}{d - \delta_z}\left(A\frac{\delta_z}{d} + l(\delta_x + \delta_y)\right) \approx \frac{\varepsilon}{d}\left(A\frac{\delta_z}{d} + l(\delta_x + \delta_y)\right)$$

$$\Delta C_{350-3}(\delta_x, \delta_y, \delta_z) \approx \quad \text{(Eq. 2c)}$$
$$\frac{\varepsilon}{d - \delta_z}\left(A\frac{\delta_z}{d} + l(-\delta_x - \delta_y)\right) \approx \frac{\varepsilon}{d}\left(A\frac{\delta_z}{d} + l(-\delta_x - \delta_y)\right)$$

$$\Delta C_{350-4}(\delta_x, \delta_y, \delta_z) \approx \quad \text{(Eq. 2d)}$$
$$\frac{\varepsilon}{d - \delta_z}\left(A\frac{\delta_z}{d} + l(\delta_x - \delta_y)\right) \approx \frac{\varepsilon}{d}\left(A\frac{\delta_z}{d} + l(\delta_x - \delta_y)\right)$$

Equations 2a-d can be written in matrix form as Equation 3:

$$\Delta C = \frac{\varepsilon}{d}\begin{bmatrix} -l & l & \frac{A}{d} \\ l & l & \frac{A}{d} \\ -l & -l & \frac{A}{d} \\ l & -l & \frac{A}{d} \end{bmatrix}\begin{bmatrix} \delta_x \\ \delta_y \\ \delta_z \end{bmatrix} \equiv M\begin{bmatrix} \delta_x \\ \delta_y \\ \delta_z \end{bmatrix} \quad \text{(Eq. 3)}$$

The matrix M of Equation 3 is full rank, allowing a determination of the movement of the first substrate 341 relative to the second substrate 342 by computing:

$$\begin{bmatrix} \delta_x \\ \delta_y \\ \delta_z \end{bmatrix} = (M^T M)^{-1} M^T \Delta C \quad \text{(Eq. 4)}$$

Thus, a measurement of the variable capacitances of the force sensors 350-1, 350-2, 350-3 and 350-4 can be used to determine the displacement of the first substrate 341 relative to the second substrate 342. Based on the determined displacement and mechanical properties of the attachment mechanism which couples the first and second substrate together, the force applied to the input surface 320 may be determined. In some embodiments, positional information for input objects contacting the input surface 320 may be determined by capacitive sensor electrodes (not shown) disposed on the first substrate 341. The capacitive sensor electrodes may be also used to determine the force applied to the input surface 320. In some embodiments, force information for each input object applying a force to the input surface may be separately determined; that is, force may be determined on a per input object basis.

The force sensors discussed in connection with FIG. 2 and FIG. 3 enable detection of the force applied to the input surface of the input device based on a change in a variable capacitance of the force sensors. Specifically, movement of the first substrate relative to the second substrate results in: (i) a change in the area of overlap between a force sensor electrode and a conductive portion; and/or (ii) a change in the distance between a force sensor electrode and a conductive portion. Scenarios (i) and (ii) will change the variable capacitance of each of the force sensors. By appropriately configuring the force sensor electrodes, "positive" or "negative" displacements in the first, second and/or third direction (362, 364, 360) may be determined. Specifically, the force sensors shown in FIG. 3 are designed to be sensitive (i.e. vary in a capacitive coupling) to "positive" or "negative" displacement along the first and second directions 362 and 364. For simplicity, displacement along the third direction 360 can be considered to be unidirectional, since any displacement of the first substrate 341 from a default/resting position will necessarily occur "downwardly" in a positive direction along the third direction 360.

Table 1 summarizes the variable capacitance behavior of each force sensor of the input device 300 in response to five degrees of motion (i.e., five types of independent motion):

TABLE 1

Force Sensor behavior due to displacement

| Displacement direction | Force Sensor 350-1 | Force Sensor 350-2 | Force Sensor 350-3 | Force Sensor 350-4 |
|---|---|---|---|---|
| (+) $\delta_z$ | + | + | + | + |
| (+) $\delta_x$ | − | + | − | + |
| (−) $\delta_x$ | + | − | + | − |
| (+) $\delta_y$ | + | + | − | − |
| (−) $\delta_y$ | − | − | + | + |

Thus, the combined measurements from all the force sensors may be used to determine the magnitude of displacement (i.e. force) of the first substrate as well as the direction of the displacement, as determined by the arrangement of the force sensor electrode with respect to the conductive portions of each force sensor.

Figure 4A:
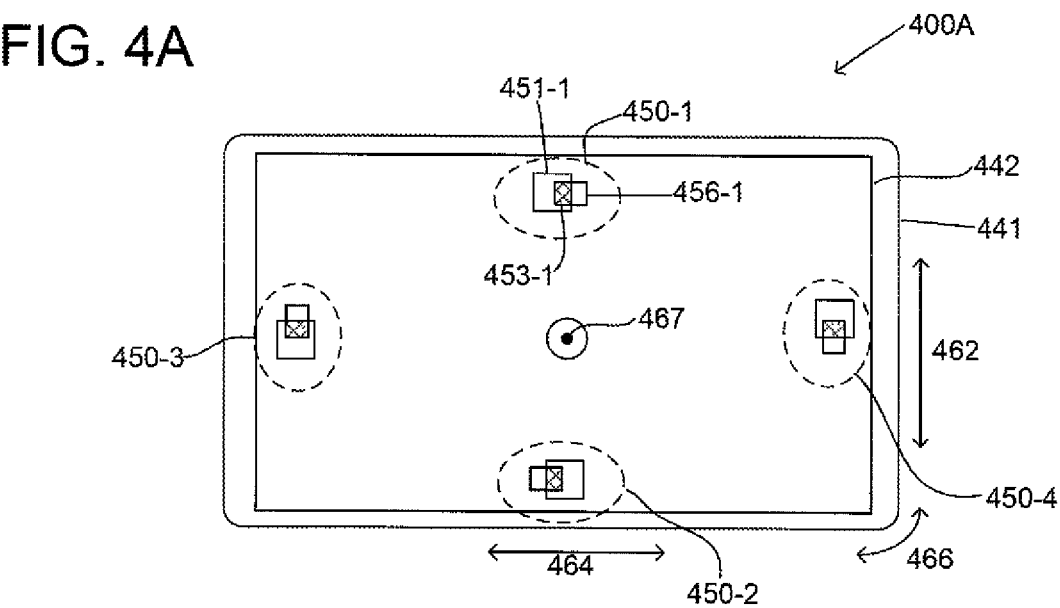
FIGS. 4A and 4B illustrate respective a top views of an input device in accordance with an embodiment of the invention.

Turning now to FIG. 4A, a top view of an input device 400A is illustrated. The input device 400 is similar in construction to input devices 200 and 300 of FIGS. 2 and 3. The input device 400A comprises a first substrate 441 coupled to a second substrate 442. The first substrate 441 includes an input surface (not shown) and is configured to move in a planar direction relative to the second substrate 442 (i.e., vertical "z" displacement is not contemplated). The input device 400A also includes a plurality of force sensors 450-1, 450-2, 450-3 and 450-4. Each force sensor comprises a first force sensor electrode disposed on the first substrate 441 which is forms a variable capacitance with a first conductive portion of the second substrate 442. For example, force sensor 450-1 comprises force sensor electrode 451-1 which is capacitively coupled to conductive portion 456-1. Force sensors 450-2, 450-3 and 450-4 comprise analogous components of force sensor electrodes and conductive portions which are not enumerated for purposes of clarity.

The force sensors 450-1, 450-2, 450-3 and 450-4 shown in FIG. 4A differ from force sensors 250-X and 350-X shown in FIG. 2 and FIG. 3, respectively. When a non-normal (non-orthogonal) force is applied to the input surface of input device 400A, resulting in movement of the first substrate 441 relative to the second substrate 442 in a first and/or second direction 462 and 464, force sensors 450-1, 450-2, 450-3 and 450-4 are configured such that a variable capacitance associated with each of the force sensors remains substantially constant in response to movement in one of the first direction 462 and the second direction 464. Specifically, with reference to force sensor 450-1, the area of overlap between the first force sensor electrode 451-1 and the first conductive portion 456-1, enumerated as area of overlap 453-1, does not change in response to motion of the first substrate 441 in a first direction 462. Consequently, the variable capacitance of force sensor 450-1 does not significantly change in response to motion in the first direction. Similarly, the variable capacitance of force sensor 450-3 does not change in response to motion of the first substrate 441 in the second direction 464.

In one embodiment, an input object applying a force to the input surface results in motion of the first substrate 441 in only the first and/or second direction 462 and 464 (vertical and rotational motion is not present). Measurement of the variable capacitances of two force sensors, such as force sensors 450-1 and 450-3, can be used to determine the displacement of the first substrate 441 in both the first and second directions 462 and 464. Based on the determined displacement, a measurement of the force applied to the input surface can be determined. By arranging the force sensor electrodes in particular configurations, "positive" or "negative" displacements in the first and/or second direction (462, 464) may be determined. Specifically, the force sensors 450-1 and 450-3 shown in FIG. 4 exhibit sensitivity (i.e. vary in a capacitive coupling) to "positive" or "negative" displacement along the first and second directions 462 and 464 from a neutral or "default" position of the first substrate relative to the second substrate.

In another embodiment, an input object applying a force to the input surface results in motion of the first substrate 441 in a first direction 462, a second direction 464, and a rotation of the first substrate 441 relative to the second substrate 442, enumerated as motion direction 466. In such an embodiment, the first substrate 441 is configured to rotate relative to the second substrate 442 in response to a non-normal force applied to the input surface of input device 400A. For example, the first substrate 441 is configured to rotate about an axis (perpendicular to the plane of FIG. 4A) passing through point 467 which is at the center of the input surface. The location of the point 467 and the axis of rotation may be anywhere on the input surface, or even outside of the input surface. The location of point 467 is determined by the attachment mechanism which couples the first and second substrates. A measurement of the rotational displacement of the first substrate 441 may be determined by at least one of the force sensors 450-1 and 450-3. The clockwise ("positive") or counterclockwise ('negative") rotation of the first substrate 441 is determine by the change in the variable capacitance of at least one of the force sensors 450-1 and 450-3.

Table 2 summarizes the variable capacitance response of force sensors 450-1 and 450-3 in response to motion of the first substrate 441 in the first direction 462 ($\delta_x$), the second direction 464 ($\delta_x$) and rotational directions 466 ($\delta_\theta$) in response to the six different types of independent motion.

TABLE 2

Force Sensor 450-1 and 450-3 response due to displacement

| Displacement direction | Force Sensor 450-1 | Force Sensor 450-3 |
|---|---|---|
| (+) $\delta_x$ | − | Constant |
| (−) $\delta_x$ | + | Constant |
| (+) $\delta_y$ | Constant | − |
| (−) $\delta_y$ | Constant | + |
| (+) $\delta_\theta$ | − | − |
| (−) $\delta_\theta$ | + | + |

Thus, the combined measurements from the force sensors 450-1 and 450-3 may be used to determine both the magnitude of the displacement (i.e. force) of the first substrate, and the direction of the displacement. This is a function of the arrangement of the force sensor electrode with respect to the conductive portions of each force sensor.

While the embodiments discussed above with respect to FIG. 4A include two force sensors to determine different types of motions of the first substrate 441 in response to a force applied to the input surface, in some cases the combinatorial (i.e., combined or aggregate) movement in all three directions (462, 464 and 466) results in a combination of measurements where the specific displacements along each of the directions is not readily discernible. While it should be appreciated that the first force sensor 450-1 is immune to effects of movement in the first direction 462 and the second force sensor 450-3 is immune to effects of movement in the second direction 464, neither force sensor is immune to movement in the rotational direction 466. Furthermore, each force sensor 450-1 and 450-3 is sensitive to clockwise (+$\delta_\theta$) and counter clockwise (−$\delta_\theta$) motion in the same manner (i.e. both sensors have the same change in their variable capacitance (+ or −)) in response to motion in either of the directions. A straightforward approach to this problem involves the addition of one more force sensors. For example, in an embodiment including force sensors 450-1, 450-2 and 450-3, the capacitive response (i.e. the change in the variable capacitances of the force sensors) may be summarized as set forth in Table 3:

TABLE 3

Force Sensor 450-1, 450-2 and 450-3 response due to displacement

| Displacement direction | Force Sensor 450-1 | Force Sensor 450-2 | Force Sensor 450-3 |
|---|---|---|---|
| (+) $\delta_x$ | − | + | Constant |
| (−) $\delta_x$ | + | − | Constant |
| (+) $\delta_y$ | Constant | Constant | − |
| (−) $\delta_y$ | Constant | Constant | + |
| (+) $\delta_\theta$ | − | − | − |
| (−) $\delta_\theta$ | + | + | + |

The use of a third force sensor 450-2 enables the determination of combinatorial movement of the first substrate 441 along all three directions (462, 464, and 466) without any limitations.

As discussed above with reference to FIG. 3, a variable capacitance associated with each force sensor can be measured based on the movement of the first substrate relative to the second substrate, the distance separating each force sensor electrode from each conductive portion, and the area of overlap between the each force sensor electrode and each conductive portion. With reference to FIG. 4A, unlike FIG. 3, the variable capacitances of force sensors 450-1, 450-2, 450-3 and 450-4 remains substantially constant in response to at least one type of motion, the types of motion comprising the first and second direction 462 and 464.

In one embodiment, as described above with reference to FIG. 4A, an input object applying a force to the input surface results in lateral motion of the first substrate 441 in only the first and/or second direction 462 and 464 (vertical and rotational motion is not present). In this example, $S_{450-1}$, $S_{450-2}$, $S_{450-3}$, $S_{450-4}$ represent the measurements of the variable capacitance of the four force sensors 450-1, 450-2, 450-3 and 450-4, respectively. The displacement of the first substrate 441 relative to the second substrate 442 in the first and second directions 462 and 464 can be modeled by Eq. 5a-b:

$$\delta_X \approx k(S_{450-1} - S_{450-2}) \quad \text{(Eq. 5a)}$$

$$\delta_Y \approx k(S_{450-3} - S_{450-4}) \quad \text{(Eq. 5b)}$$

wherein the constant k is determined by the mechanical properties of the attachment mechanism coupling the first and second substrates 441 and 442 together. Note that second order effects may be ignored for simplicity and the displacement of the first substrate 441 is relatively small compared to the size of the first substrate.

In another embodiment, as described above with reference to FIG. 4A, a force applied to the input surface results in motion of the first substrate 441 in a first direction 462 and a second direction 464, and a rotation of the first substrate 441 relative to the second substrate 442 (vertical motion is not present) represented as rotational motion 466. The displacement of the first substrate 441 in the rotational direction 466 can be modeled by Eq. 5c:

$$\delta_\theta \approx k(S_{450-1} + S_{450-2} + S_{450-3} + S_{450-4}) \quad \text{(Eq. 5c)}$$

For simplicity, Eq. 5c assumes that the axis of rotation defined by point 467 is located at the geometric center of the input surface of the first substrate 441 and that the force sensors 450-1, 450-2, 450-3 and 450-4 are symmetrically located about the point 467. Analogous computational techniques can be used for other geometries, where the rotation of the first substrate 441 is not about the center of the substrate and/or the force sensors are not symmetrically placed about the geometric center of rotation.

In the embodiments of FIG. 4A described above, vertical motion of the first substrate 441 relative to the second substrate 442 was not involved. In other words, a normal force applied to the input surface did not move the first substrate 441 closer to the second substrate 442, and thus did not change the distance between a force sensor electrode and conductive portion in any of the force sensors described. If such a motion was present, the capacitive behavior of each of the force sensors would also be subject to the vertical displacement of the first substrate 441. As a result, the combinatorial movement in all three directions (462, 464 and 466) along with a vertical displacement (not enumerated but analogous to vertical directions 260 and 360) results in a combination of measurements where the specific displacements along each of the directions is not able to be determined.

Figure 4B:
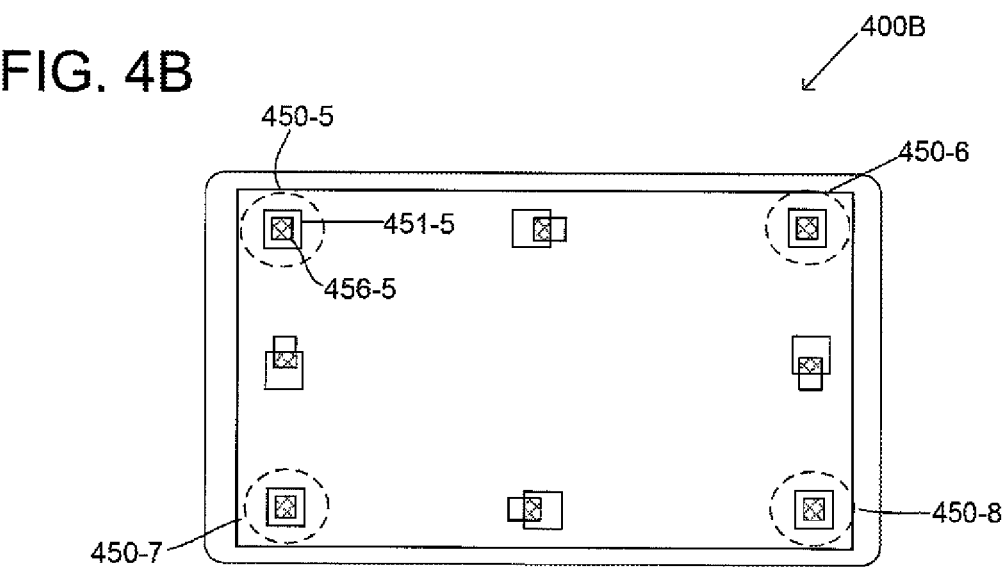

Turning now to FIG. 4B, an embodiment is described which further allows for a normal force applied to the input surface of the first substrate 441 to result in a vertical displacement towards the second substrate 442. The input device 400B shown in FIG. 4B is similar to the input device of FIG. 4A and only additional features are enumerated for simplicity. The input device 400B is configured to allow movement of the first substrate 441 relative to the second substrate 442 in a direction perpendicular to the input surface (analogous to input surface 220/320 and perpendicular motion 260/360). The perpendicular (i.e., vertical) motion of the input surface and the first substrate 441 relative to the second substrate 442 results in a change the variable capacitances of force sensors 450-1, 450-2, 450-3 and 450-4. As mentioned above with respect to FIG. 4A, the variable capacitance of each of the force sensors remains substantially constant in response to movement in one of the first direction 462 and the second direction 464, and in the embodiment of FIG. 4B, the variable capacitances exhibited by force sensors 450-1, 450-2, 450-3 and 450-4 also change in response to motion in a vertical direction. In other embodiments described below, force sensors may be implemented which form at least one variable capacitance which does not change in response to vertical motion are described.

The input device 400B further comprises four force sensors 450-5, 450-6, 450-7 and 450-8 which are configured such that a variable capacitance of each of the force sensors remains substantially constant in response to movement in the first direction 462 and the second direction 464. In other words, force sensors 450-5, 450-6, 450-7 and 450-8 are only sensitive to vertical motion of the first substrate relative to the second substrate. Specifically, with reference to force sensor 450-5, the area of overlap between the first force sensor electrode 451-5 and the first conductive portion 456-5 of the second substrate 442 does not change due to lateral and/or rotational motion of the first substrate 441. Table 4 summarizes the capacitive response (i.e. the change in the variable capacitance of the force sensors) of input device 400B shown in FIG. 4B:

TABLE 4

Force Sensor behavior due to displacement of input device 400B

| Displacement direction | Force Sensor 450-1 | Force Sensor 450-2 | Force Sensor 450-3 | Force Sensor 450-4 | Force Sensor 450-5 | Force Sensor 450-6 | Force Sensor 450-7 | Force Sensor 450-8 |
|---|---|---|---|---|---|---|---|---|
| (+) $\delta_x$ | − | + | Constant | Constant | Constant | Constant | Constant | Constant |
| (−) $\delta_x$ | + | − | Constant | Constant | Constant | Constant | Constant | Constant |
| (+) $\delta_y$ | Constant | Constant | − | + | Constant | Constant | Constant | Constant |
| (−) $\delta_y$ | Constant | Constant | + | − | Constant | Constant | Constant | Constant |
| (+) $\delta_\theta$ | − | − | − | − | Constant | Constant | Constant | Constant |
| (−) $\delta_\theta$ | + | + | + | + | Constant | Constant | Constant | Constant |
| (+) $\delta_z$ | + | + | + | + | + | + | + | + |

In this example, $Z_{450-5}$, $Z_{450-6}$, $Z_{450-7}$, $Z_{450-8}$ represent the measurements of the variable capacitance of the four force sensors 450-5, 450-6, 450-7 and 450-8, respectively. The measurements of the variable capacitance of the four force sensors 450-1, 450-2, 450-3 and 450-4 ($S_{450-1}$, $S_{450-2}$, $S_{4500-3}$, $S_{450-4}$) depend on lateral and vertical motion of the first substrate relative 441 to the second substrate 442 and can be described as:

$$\tilde{S}_{450-1} = S_{450-1} + f_{450-1}(S_{450-1}, Z_{450-5}, Z_{450-6}, Z_{450-7}, Z_{450-8}) \quad \text{(Eq. 6a)}$$

$$\tilde{S}_{450-2} = S_{450-2} + f_{450-2}(S_{450-4}, Z_{450-5}, Z_{450-6}, Z_{450-7}, Z_{450-8})$$

$$\tilde{S}_{450-3} = S_{450-3} + f_{450-3}(S_{450-3}, Z_{450-5}, Z_{450-6}, Z_{450-7}, Z_{450-8})$$

$$\tilde{S}_{450-4} = S_{450-4} + f_{450-4}(S_{450-4}, Z_{450-5}, Z_{450-6}, Z_{450-7}, Z_{450-8})$$

If the force applied to the input surface does not result in any vertical motion of the first substrate 441 relative to the second substrate 442, then:

$$\tilde{S}_{450-3} = S_{450-3}, \tilde{S}_{450-4} = S_{450-4}, \tilde{S}_{450-2} = S_{450-2}, \tilde{S}_{450-1} = S_{450-1} \quad \text{(Eq. 6b)}$$

since:

$$f_L(S_L,0,0,0,0) = 0 \quad f_R(S_R,0,0,0,0) = 0$$

$$f_T(S_T,0,0,0,0) = 0 \quad f_B(S_B,0,0,0,0) = 0 \quad \text{(Eq 6c)}$$

Furthermore, if the mechanical model of the deflection of the first substrate 441 relative to the second substrate is purely linear, then $f_L(0,Z_{TL},Z_{TR},Z_{BL},Z_{BR})$, $f_R(0, Z_{TL},Z_{TR},Z_{BL},Z_{BR})$, $f_T(0,Z_{TL},Z_{TR},Z_{BL},Z_{BR})$, and $f_B(0,Z_{TL},Z_{TR},Z_{BL},Z_{BR})$ will be a linear combination of the four force sensors 450-5, 450-6, 450-7 and 450-8. Thus, in the presence of vertical deflection, displacement of the first substrate relative to the second substrate in all three directions (462, 464, and 466) can be determined using Eq. 5a-c.

In the embodiment described above in FIG. 4B, the vertical motion of the first substrate is assumed to be non-uniform. In other words, the change in distance between the first and second substrate in response to a force applied in a perpendicular direction to the input surface is not substantially equal across the input surface. Force applied to the input surface in a perpendicular direction and in the geometric center of the input surface may result in uniform vertical deflection; while the same force applied in a corner of the input surface may result in a substantially different amount of vertical deflection as measured, for example, at different locations across the input surface. The mechanical properties of the input device and attachment mechanism between the first substrate the second substrate determine not only the directions in which the first substrate is configured to move, but also the type of motion allowed. For example, in various embodiments, the input device may be configured to allow lateral motion, rotational motion, and/or vertical motion (uniform and non-uniform). It should be understood, given descriptions of the embodiments above, that the type, number and arrangements of force sensors configured to measure the deflection of the first substrate relative to the second substrate should be selected based on the type of motion allowed in response to forces imparted on the input surface of the input device.

FIGS. 5A-5D show various embodiments of the input device having different arrangements of force sensors configured to detect motion of the first substrate relative to the second substrate. The arrangement and type of force sensors used in the configurations shown depend on the type of the input surface the input device is configured for. For example, in the embodiment of FIG. 5A, the input device allows: (i) non-uniform vertical translation; (ii) lateral motion in a first and second direction; and (iii) rotational motion in response to a force applied to the input surface. The input device comprises eight force sensors. Four of the eight force sensors are "Z-sensors", which are immune to lateral or rotational motion (i.e., they are only able to sense vertical motion). The other four force sensors are "shear sensors", at least one of which is immune to lateral motion in one direction and at least one other is immune to lateral motion in a second direction. Furthermore, each of the four "shear sensors" is sensitive to rotational motion. The arrangement and type of force sensors used in FIG. 5A enable a measurement and determination of the amount of deflection in directions (i)-(iii) and the force imparted to the input surface which causes the deflection of the input surface.

In another example, in the embodiment of FIG. 5B, the input device allows (i) non-uniform vertical translation and (ii) lateral motion in a first and second direction. The input device comprises eight force sensors. Four of the eight force sensors are "Z-sensors", which are immune to lateral or rotational motion (i.e., they are only able to sense vertical motion). The other four force sensors are "shear sensors", wherein at least one is immune to lateral motion in one direction and at least one other is immune to lateral motion in a second direction. All of the force sensors of the input device are immune to rotation of the first substrate about its center relative to the second substrate. The arrangement and type of force sensors used in FIG. 5B enable a measurement and determination of the amount of deflection in directions (i)-(ii) and the force imparted on the input surface causing the deflection of the input surface.

In another example, in the embodiment of FIG. 5C, the input device allows for (i) uniform vertical translation and (ii) lateral motion in a first and second direction and (iii) rotational motion in response to a force applied to the input surface. The input device comprises five force sensors. One of the force sensors is a "Z-sensor" which is immune to lateral or rotational motion (able to only sense vertical motion). Since the vertical translation of the first substrate relative to the second substrate is uniform, one "Z" force sensor is able to determine a change in the variable capacitances of any of the other force sensors due to a vertical displacement. Four of the force sensors are "shear" sensors, wherein at least one is immune to lateral motion in one direction and at least one other is immune to lateral motion in a second direction. The arrangement and type of force sensors used in FIG. 5C enable a measurement and determination of the amount of deflection in directions (i)-(iii) and the force imparted on the input surface causing the deflection of the input surface.

In yet another example, in the embodiment of FIG. 5D, the input device allows: (i) uniform vertical translation, (ii) lateral motion in a first and second direction, and (iii) rotational motion in response to a force applied to the input surface. The input device comprises five force sensors. One of the force sensors is a "Z-sensor" which is immune to lateral or rotational motion (able to only sense vertical motion). Since the vertical translation of the first substrate relative to the second substrate is uniform, one "Z" force sensor is able to determine a change in the variable capacitances of any of the other force sensors due to a vertical displacement. Four of the force sensors are "shear" sensors, wherein at least one is immune to lateral motion in one direction and at least one other is immune to lateral motion in a second direction. The arrangement and type of force sensors used in FIG. 5D enable a measurement and determination of the amount of deflection in directions (i)-(iii)

and the force imparted on the input surface causing the deflection of the input surface.

In the various embodiments described with reference to FIGS. 1-5, a variable capacitance associated with each force sensor may be used to determine an amount of deflection and/or translation of a first substrate relative to a second substrate. Similarly, the variable capacitance of each force sensor may be used to determine the force applied to an input surface of the input device. In the embodiments described in FIGS. 1-5, each force sensor includes a first force sensor electrode disposed on the first substrate and a conductive portion disposed on the second substrate. FIG. 6 shows various alternate embodiments of force sensors configured to detect deflection of the first substrate relative to the second substrate.

Turning to FIG. 6A-F, a plurality of embodiments for a force sensor which can be used by the input device to determine deflection and/or translation of a first substrate relative to a second substrate are shown. For example, the force sensor 610 of FIG. 6A-B comprises a first force sensor electrode 611, a second force sensor electrode 612, and a conductive area 614. The force sensor 610 may be implemented as part of the input device described above wherein the first and second force sensor electrodes 611 and 612 are disposed on a first substrate and a second substrate comprises the conductive portion 614. A first variable capacitance of the force sensor 610 is formed between the first and second force sensor electrodes 611 and 612. In response to movement of the conductive portion 614, the first variable capacitance changes due to (i) a change in the distance between the first and second substrates (and thus the distance between the force sensor electrode 611 and 612 and the conductive portion 614) and/or (ii) a change in the area of overlap between the conductive portion 614 and the first and second force sensor electrodes 611 and 612.

In the embodiments of FIGS. 6A-B, the first variable capacitance may result from a transcapacitive coupling between the first and second force sensor electrode 611 and 612, wherein the first force sensor electrode 611 is configured to transmit a sensing signal and the second force sensor electrode 612 is configured to receive a resulting signal. The resulting signal received by force sensor electrode 612 comprises effects of the conductive portion 614 on the received resulting signal. For example, in FIG. 6A, under the assumption that the conductive portion will always overlap the force sensor electrodes in response to lateral motion of the first substrate relative to the second substrate, the force sensor 610 is essentially a vertical displacement sensor. In other words, the force sensor 610 is immune to lateral motion of the conductive portion 614. Conversely, the force sensor 620 of FIG. 6B which comprises similarly operating sensor electrodes as force sensor 610 is sensitive to lateral and vertical motion of the conductive portion 614 relative to sensor electrodes 611 and 612.

FIG. 6C shows another alternate embodiment for a force sensor. Force sensor 630 comprises a first, second, third and fourth force sensor electrodes (611-1, 611-2, 612-1, and 612-2) and a conductive portion 614. The first and third force sensor electrodes 611-1 and 612-1 form a first variable capacitance and the second and fourth force sensor electrodes form a second variable capacitance. The first and second variable capacitance values may correspond to a transcapacitive coupling between the pair of electrodes that varies based on the deflection and/or translation of the conductive portion 614 relative to the force sensor electrodes. The force sensor 630 is essentially a combination of force sensor 610 and 620 with a sharing of a single conductive portion 614.

FIG. 6D shows another alternate embodiment of a force sensor. Force sensor 640 is similar to force sensor 630 without of one of the force sensor electrodes. The force sensor 640 comprises a first, second and third force sensor electrodes (611-1, 611-2 and 612-1) and a conductive portion 614. The first and third force sensor electrodes 611-1 and 612-1 form a first variable capacitance and the second and third force sensor electrodes 611-1 and 612-1 form a second variable capacitance. Specifically, the third force sensor electrode 612-1 is configured to transmit a sensor signal, and the first and second force sensor electrodes 611-1 and 611-2 are each configured to receive a respective resulting signal. The resulting signals received by force sensor electrodes 611-1 and 611-2 represent a first and second variable capacitance, respectively. Movement of the conductive portion 614 relative to the first, second and third force sensor electrodes may change the variable capacitances. Specifically, vertical motion between the conductive portion and the force sensing electrodes will change the first and second variable capacitance, while lateral motion will only change the second variable capacitance (since the area of overlap of distance between the first and third force sensor electrodes 611-1 and 612-1 and the conductive portion does not change).

FIG. 6E shows another alternate embodiment of a force sensor. Force sensor 650 comprises a first force sensor electrode 611-1 which substantially surrounds a second force sensor electrode 612-2 which substantially surrounds a third force sensor electrode 611-1. A conductive portion 614 overlaps at least part of each of the first, second and third force sensor electrodes. The conductive portion 614 comprises an interior non-conductive region. In response to lateral movement of the conductive portion 614 and its interior non-conductive region relative to the first, second and third force sensor electrodes, the area of overlap between at least one of the force sensor electrodes and the conductive portion varies.

In one embodiment, the second force sensor electrode 612-1 is configured to transmit a sensing signal and the first and third force sensor electrodes 611-1 and 611-2 are each configured to receive a resulting signal indicative of a variable capacitance, namely, a first variable capacitance formed between the first and second force sensor electrode and a second variable capacitance formed between the second and third force sensor electrode. A measurement of the change in the first and/or second variable capacitances can be used to determine the amount of vertical and/or lateral motion of a first substrate, where the force sensor electrodes are disposed on the first substrate, and a second substrate comprises the conductive portion.

FIG. 6F shows another embodiment of a force sensor in accordance with the invention. In one embodiment, force sensor 660 comprises four force sensor electrodes 611-1, 611-2, 611-3, and 611-4 disposed on a first substrate of the input device, and a conductive portion 614 disposed on a second substrate of the input device. Each of the four force sensor electrodes is configured to form a variable capacitance with the conductive portion 614. Specifically, each of the four force sensor electrodes is configured to form a variable capacitance with the conductive portion 614. In response to movement of the first substrate (comprising the force sensor electrodes) relative to the second substrate (comprising the conductive portion), the variable capacitance will change. A measurement of the change in variable capacitance of the force sensor may be used to determine the amount of deflection and/or translation of the first substrate relative to the second substrate.

In another embodiment, force sensor 660 comprises 8 force sensor electrodes (611-1,611-1, 611-1, 611-1, 612-1, 612-2, 612-3, and 612-4) disposed on a first substrate of the input device, and a conductive portion 614 disposed on a second substrate of the input device. Each pair of force sensor electrodes (e.g. force sensor electrodes 611-1 and 611-2) is configured to form a variable capacitance which varies in response to movement of the conductive portion 614. Thus, four variable capacitances are formed in force sensor 660; and a measurement of the change in the first, second, third and/or fourth variable capacitances of force sensor 660 can be used to determine the amount of vertical and/or lateral motion of a first substrate, upon which the force sensor electrodes are disposed, with respect to a second substrate comprising the conductive portion.

Figure 7:
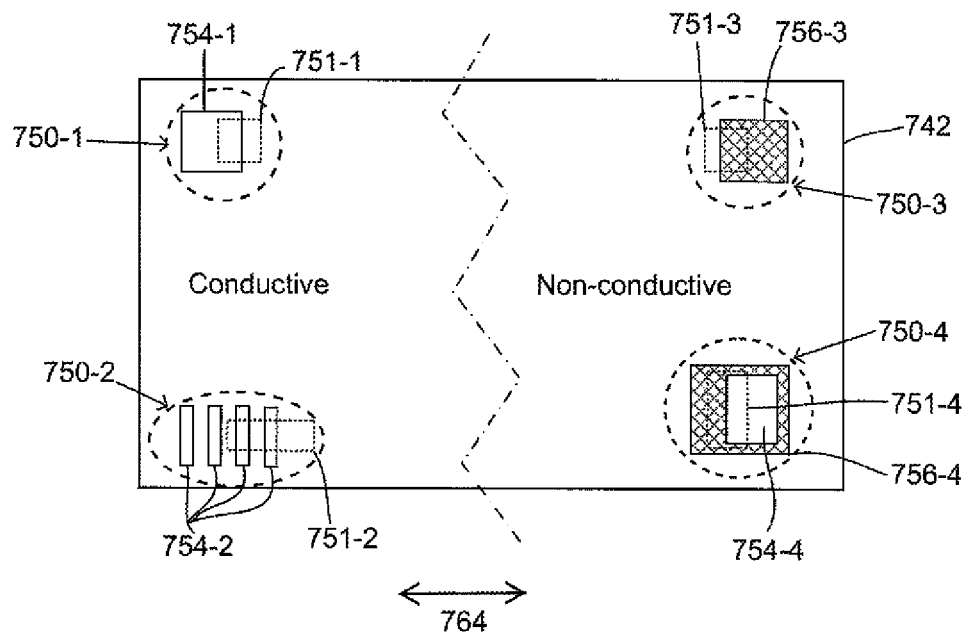
FIG. 7 illustrates multiple embodiments of a second substrate and the arrangement of a conductive portion on the second substrate in accordance with an embodiment of the invention.

In the various embodiments of the input device and force sensors described above, a force sensor includes a conductive portion which deflects and/or translates relative to the force sensor electrode(s) of the force sensor. The deflection and/or translation of this conductive portion is dependent on the motion of the second substrate relative to the first substrate of the input device. FIG. 7 shows multiple embodiments of the second substrate 742 and the arrangement of the conductive portion on the second substrate 742. Specifically, FIG. 7 illustrates the functional equivalence (interchangeability) of a conductive portion being disposed on a non-conductive second substrate and a non-conductive portion being disposed on a conductive second substrate FIG. 7 shows two different embodiments of an exemplary second substrate. In one embodiment, shown to the left of the broken hash line, is a second substrate 742 which is conductive. In another embodiment, shown to the right of the broken hash line, the second substrate 742 is non-conductive. While it is possible to have a second substrate with similar properties (e.g., half conductive and half non-conductive), FIG. 7 primarily illustrates the function and design of the second substrate in either embodiment. FIG. 7 also shows four force sensors (750-1, 750-2, 750-3, 750-4) in accordance with the embodiments of the force sensors described in FIGS. 2-6. Each force sensor comprises at least one force sensor electrode disposed on a first substrate (not shown for clarity, but analogous to the first substrates of FIGS. 2-6 (e.g. 241, 341, etc.)). The area of the at least one force electrode is shown as a dashed line in all four of the force sensors in FIG. 7. As described above, each force sensor of the input device is configured to form at least one variable capacitance with a conductive portion of the second substrate. The following description shows possible arrangements of this conductive portion.

In a first embodiment, a first force sensor 750-1 of FIG. 7 comprises at least one force sensor electrode 751-1, and the second substrate 742, which is conductive, comprises a non-conductive portion 754-1. In some embodiments, this non-conductive portion 754-1 may be an aperture in the second substrate or an insulator disposed on the second substrate. Thus, the first force sensor electrode 751-1 partially overlaps the non-conductive portion 754-1 and a conductive portion of the conductive substrate 742. In response to motion of the second substrate in a first direction (e.g. direction 764) relative to the first substrate (not shown) and the at least one force sensor electrode 751-1, the area of overlap between the at least one force sensor electrode 751-1 and the conductive portion of substrate 742 changes. This results in a change of the variable capacitance formed between the at least one force sensor electrode 751-1 and the conductive portion of the second substrate 742. Specifically, motion along the first direction 764 will result in a greater/lesser area of overlap between the non-conductive portion 754-1 of the second substrate 742 and, thus, a correspondingly lesser/greater area of overlap between the conductive portion of the second substrate 742 and the at least one force sensor electrode 751-1. A measurement of the change in the variable capacitance may be used to determine the amount of lateral motion between the first substrate (not shown) and the second substrate 742.

In a second embodiment, a second force sensor 750-2 of FIG. 7 comprises at least one force sensor electrode 751-2, and the second substrate 742, which is conductive, comprises non-conductive portions 754-2. In some embodiments, the non-conductive portions 754-2 may be apertures in the second substrate or an insulator disposed on the second substrate. Thus, the second force sensor electrode 751-2 partially overlaps the non-conductive portions 754-2 and a conductive portion of the conductive substrate 742. In response to motion of the second substrate in a first direction (e.g. direction 764) relative to the first substrate (not shown) and the at least one force sensor electrode 751-2, the area of overlap between the at least one force sensor electrode 751-2 and the conductive portion of substrate 742 changes. This will result in a change of the variable capacitance formed between the at least one force sensor electrode 751-2 and the conductive portion of the second substrate 742.

In a third embodiment, a third force sensor 750-3 of FIG. 7 comprises at least one force sensor electrode 751-3 and a conductive portion 756-3 disposed on the non-conductive second substrate 742. Thus, the third force sensor electrode 751-3 partially overlaps the conductive portion 756-3 of the non-conductive substrate 742. In response to motion of the second substrate in a first direction (e.g. direction 764) relative to the first substrate (not shown) and the at least one force sensor electrode 751-3, the area of overlap between the at least one force sensor electrode 751-3 and the conductive portion 756-3 of second substrate 742 changes. This results in a change of the variable capacitance formed between the at least one force sensor electrode 751-3 and the conductive portion 756-3 of the second substrate 742. Specifically, motion along the first direction 764 results in a greater/lesser area of overlap between the conductive portion 756-3 of the second substrate 742 and the at least one force sensor electrode 751-3, changing the variable capacitance of force sensor 750-3. A measurement of the change in the variable capacitance may be used to determine the amount of lateral motion between the first substrate (not shown) and the second substrate 742.

In a fourth embodiment, a fourth force sensor 750-4 of FIG. 7 comprises at least one force sensor electrode 751-4 and a conductive portion 756-4 disposed on the non-conductive second substrate 742. Thus, the fourth force sensor electrode 751-4 partially overlaps the conductive portion 756-4 of the non-conductive substrate 742. In response to motion of the second substrate in a first direction (e.g. direction 764) relative to the first substrate (not shown) and the at least one force sensor electrode 751-4, the area of overlap between the at least one force sensor electrode 751-4 and the conductive portion 756-4 of second substrate 742 changes. This results in a change of the variable capacitance formed between the at least one force sensor electrode 751-4 and the conductive portion 756-4 of the second substrate 742. Specifically, motion along the first direction 764 results in a greater/lesser area of overlap between the conductive portion 756-3 of the second substrate 742 and the at least one force sensor electrode 751-4, changing the variable capacitance of force sensor 750-4. A measurement of the change in the variable capacitance may be used to determine the amount of lateral motion between the first substrate (not shown) and the second substrate 742.

In all embodiments discussed herein, a variety of different materials and techniques can be used to form the various electrodes. For example, the first, second, third and/or fourth electrodes can be formed using a variety of material deposition techniques. As other examples, conductive materials such as metals or conductive oxides may be sputtered or plated on the substrate and etched to leave behind the desired electrode pattern. In other examples, the electrode material can be printed directly on the substrate, for example, by screen printing. In yet another example the electrode material may be embedded directly into the corresponding substrate. Finally, in yet other embodiments, electrode structures may be formed separately and then attached to the appropriate substrate.

Furthermore, in various embodiments discussed herein, force sensor electrodes disposed on the first substrate are used to determine rotational and/or lateral forces applied to the input surface of the input device. In some embodiments described above, vertical forces imparted on the input surface of the input device do not impart any relative motion between the first substrate and the second substrate, likely due to the mechanical arrangement of the coupling mechanisms between the first and second substrates. Such an arrangement may be beneficial, since the space required for the vertical displacement allows for a thinner input device. However, the desire to measure the normal component of an applied force to the input surface may be facilitated by the first substrate alone. For example, in one embodiment, the first substrate may comprise a first, second and third array of sensor electrodes, wherein the first and second arrays are used to determine positional information about input objects in the sensing region. The third array and at least one of the first and second arrays of sensor electrodes can be used to measure the normal force applied to the input surface. For example, the first substrate may comprise a pliable component including the first and second arrays of sensor electrodes and a compressible component separating the pliable component from the third array of sensor electrodes. In response to a force applied to the input surface, the pliable component may deflect towards the third array of sensor electrodes, causing a change in the capacitive coupling between at least one of the first and second arrays and the third array of sensor electrodes. A measurement of the change in the capacitive coupling can be used to determine a normal component of a force imparted on the input surface. The determined normal component may be complimented with the determined lateral and/or rotational components (as determined by the force sensor electrodes) to provide force information for input objects in the sensing region.

A variety of materials may be used for the various other substrates in the input device. Common substrate materials such as polyimide (sold under the name Kapton®), polyethylene terephthalate (PET), polycarbonate, fiberglass, polymethyl methacrylate, metals, plastic, glass, and others may be used. A variety of materials may be used to provide the electrodes in the input device. As specific examples, the various electrodes may be patterned using a conductive material, such as ITO (indium tin oxide), silver or carbon conductive ink, and copper. Further, any appropriate patterning process may be used in forming the electrode, including sputter deposition, printing, and etching.

A capacitive input device is thus provided which is configured to sense input objects in a sensing region. The capacitive input device includes a first substrate having an input surface overlapped by the sensing region and a second substrate physically coupled to the first substrate. The first substrate further includes at least one sensor electrode configured to capacitively detect an input object in the sensing region, a first sub-set of force sensor electrodes, and a second sub-set of force sensor electrodes. The second substrate includes at least one conductive portion which is configured to move laterally, with respect to the first substrate, in response to a lateral force applied to the input surface.

A processing system for the input device comprises a sensor module and a determination module. The sensor module of the processing system is configured to operate the at least one sensor electrode disposed on the first substrate to detect input objects in the sensing region of the input device. For example, the sensor module may be configured to perform absolute and/or trans-capacitive sensing using the at least one sensor electrode to sense input objects in the sensing region. The sensor module is further configured to perform absolute and/or trans-capacitive sensing using the plurality of force sensor electrodes disposed on the second substrate. In one embodiment, the sensor module is configured to transmit a transmitter signal using a first force sensor electrode from a first sub-set of the plurality of force sensor electrodes. The processing system is further configured to receive a resulting signal using a first force sensor electrode from a second sub-set of the plurality of force sensor electrodes.

The determination module of the processing system may be configured to determine a first force value based on a first resulting signal received on a first force sensor electrode of the second sub-set of the plurality of force sensor electrodes. The first resulting signal is based on a capacitive coupling between at least one force sensor electrode of the first sub-set, the first force sensor electrode of the second sub-set and a first conductive portion of the second substrate. The determination module is further configured to determine the first force value based on a change in the first resulting signal based on lateral motion of the first substrate relative to the second substrate in response to a lateral force applied to the input surface.

The determination module of the processing system may be further configured to determine a second force value based on a second resulting signal received on a second force sensor electrode of the second sub-set of the plurality of force sensor electrodes. The second resulting signal is based on a capacitive coupling between at least one force sensor electrode of the first sub-set, the second force sensor electrode of the second sub-set a second conductive portion of the second substrate. The determination module is further configured to determine the second force value based on a change in the second resulting signal based on a lateral motion of the first substrate relative to the second substrate in response to a force applied to the input surface.

The determination module of the processing system may be further configured to determine a lateral force applied to the input surface based on the first and second force values. The determination module may be further configured to determine positional information for input objects hi the sensing region using the at least one sensor electrode and to determine force information for input objects in the sensing region based on the positional information, the first force value and the second force value.

In some embodiments, the determination module of the processing system may be further configured to determine a third force value based on a third resulting signal received on a third force sensor electrode of the second sub-set of force sensor electrodes. The third resulting signal is based on a capacitive coupling between at least one force sensor electrode of the first sub-set, the third force sensor electrode of the second sub-set and the second conductive portion of the second substrate. The determination module is further configured to determine the third force value based on a change in the third resulting signal based on a vertical motion of the first substrate relative to the second substrate in response to a force applied to the input surface.

The determination module may be configured to determine the lateral force applied to the input surface based on at least one of the first, second and third force values. In one embodiment, the determination module is configured to determine a lateral force components applied to the input surface in a first and second direction. The lateral force component in the first direction is based on the first and third force values. The lateral force component in the second direction is based on the second and third force values.

In some embodiments, the determination module is further configured to determine a third force value based on a third resulting signal received on a third force sensor electrode of the second sub-set of force sensor electrodes. The third resulting signal is based on a capacitive coupling between at least one sensor electrode of the first sub-set, the third force sensor electrode of the second sub-set and a third conductive portion of the second substrate. The determination module is further configured to determine the third force value based on a change in the third resulting signal based on a rotational motion of the first substrate relative to the second substrate in response to a force applied to the input surface.

In some embodiments, the processing system may be configured to enable a user interface action based on the determined force information. For example, the processing system may enable use of a GUI on a display based on the determined positional and force information. In some embodiments, the processing system may be configured to enable different interface actions in response to lateral, vertical and rotational forces applied to the input surface and/or different directions of the lateral and rotational forces. Thus, lateral force information may be used for panning, navigation and the like. Rotational force information can be used to rotate an interface element or to implement steering-like functionality. A variety of unique interface actions can be mapped to the dynamic or static measurements of lateral, rotational and/or vertical forces measured by the processing system.

Thus, the embodiments and examples set forth herein are presented to explain the present invention and its various applications and to enable those skilled in the art to make and use the invention. However, those skilled in the art will recognize that the foregoing description and examples have been presented for the purposes of illustration and example only. The description as set forth is not intended to be exhaustive or to limit the invention to the precise forms disclosed.

The invention claimed is:

1. An input device comprising:
 a first substrate comprising an array of sensor electrodes configured to sense input objects in a sensing region overlapping an input surface of the input device;
 a second substrate physically coupled to the first substrate and configured to move relative to the first substrate in a lateral direction and a vertical direction;
 a first force sensor comprising a first force sensor electrode disposed on the first substrate and a first conductive portion disposed on the second substrate, the first force sensor electrode and the first conductive portion forming a first variable capacitance; and
 a second force sensor comprising a second force sensor electrode disposed on the first substrate and a second conductive portion disposed on the second substrate, the second force sensor electrode and the second conductive portion forming a second variable capacitance,
 wherein, in response to vertical motion of the first substrate relative to the second substrate, the first variable capacitance and the second variable capacitance change,
 wherein, in response to lateral motion of the first substrate relative to the second substrate in a first direction, the first variable capacitance changes and the second variable capacitance remains substantially constant, and
 wherein, in response to lateral motion of the first substrate relative to the second substrate in a second direction, perpendicular to the first direction, the second variable capacitance changes and the first variable capacitance remains substantially constant.

2. The input device of claim 1, wherein, in response to the vertical motion of the first substrate relative to the second substrate, a distance between the first force sensor electrode and the first conductive portion of the first force sensor decreases, and a distance between the second force sensor electrode and the second conductive portion of the second force sensor decreases.

3. The input device of claim 1, wherein, in response to the lateral motion of the first substrate relative to the second substrate in the first direction, the first variable capacitance changes due to a change in an area of overlap between the first force sensor electrode and the first conductive portion.

4. The input device of claim 3, wherein, in response to the lateral motion of the first substrate relative to the second substrate in the first direction, the second variable capacitance remains substantially constant due to no change in the area of overlap between the second force sensor electrode and the second conductive portion.

5. The input device of claim 3, wherein, in response to the lateral motion of the first substrate relative to the second substrate in the second direction, the first variable capacitance remains substantially constant due to no change in the area of overlap between the first force sensor electrode and the first conductive portion, and the second variable capacitance changes due to a change in the area of overlap between the second force sensor electrode and the second conductive portion.

6. The input device of claim 1, wherein, in response to a rotational motion in a first direction between the first substrate and the second substrate, the first variable capacitance and the second variable capacitance both increase, and, in response to a rotational motion in a second direction, opposite the first direction, the first variable capacitance and the second variable capacitance both decrease.

7. The input device of claim 1, further comprising:
 a processing system communicatively coupled to the array of sensor electrodes and the first and second force sensor electrodes, the processing system configured to:
  determine positional information for the input objects in the sensing region from the array of sensor electrodes;

drive a sensing signal onto the first force sensor electrode and the second force sensor electrode;
determine the first variable capacitance based on a received resulting signal from the first force sensor electrode;
determine the second variable capacitance based on a received resulting signal from the second force sensor electrode;
determine a first capacitance value based on the first variable capacitance and a second capacitance value based on the second variable capacitance; and
determine the lateral and the vertical force applied to the input surface using the first and second variable capacitance values.

8. The input device of claim 1, further comprising a third force sensor, the third force sensor comprising a third force sensor electrode disposed on the first substrate and the first conductive portion disposed on the second substrate, the third force sensor electrode and the first conductive portion forming a third variable capacitance, wherein the third variable capacitance remains substantially constant in response to movement of the first substrate relative to the second substrate in a lateral direction and the variable capacitance changes in response to vertical movement of the first substrate relative to the second substrate.

9. The input device of claim 8, wherein the first force sensor further comprises a force transmitter electrode configured to form the first variable capacitive between the force transmitter electrode, the first force sensor electrode and the first conductive portion, and the third force sensor electrode further comprises the force transmitter electrode configured to form the third variable capacitance between the force transmitter electrode, the third force sensor electrode and the first conductive portion.

10. The input device of claim 9, further comprising:
a processing system communicatively coupled to the array of sensor electrodes, the first force sensor electrode, the second force sensor electrode, the third force sensor electrode, and the force transmitter electrode, the processing system configured to:
determine positional information for the input objects in the sensing region from the array of sensor electrodes;
drive a sensing signal onto the force transmitter electrode;
determine the first variable capacitance based on a received resulting signal from the first force sensor electrode;
determine the third variable capacitance based on a received resulting signal from the third force sensor electrode;
determine the first capacitance value based on the first variable capacitance and a third capacitance value based on the third variable capacitance; and
determine the lateral and vertical force applied to the input surface using the first capacitance value and the second capacitance value.

11. An input device comprising:
an array of sensor electrodes disposed on a first substrate;
a second substrate physically coupled to the first substrate, wherein in response to a force applied to the first substrate, the first substrate is configured to move in a lateral and vertical direction with respect to the first substrate;
a first force sensor electrode, a second force sensor electrode and a first force transmitter electrode disposed on the first substrate; and a processing system communicatively coupled to the array of sensor electrodes, the first force sensor electrode, the second force sensor electrode, and the first force transmitter electrode, the processing system is configured to:
determine positional information for input objects in a sensing region of the input device using the array of sensor electrodes;
drive a sensing signal onto the first force transmitter electrode;
receive a first resulting signal from the first force sensor electrode, the first resulting signal comprising effects of the sensing signal driven onto the first force transmitter electrode;
receive a second resulting signal from the second force sensor electrode, the second resulting signal comprising effects of the sensing signal driven onto the first force transmitter electrode;
determine a first variable capacitance based on the first resulting signal, wherein the first variable capacitance changes in response to lateral motion in a first direction and a vertical motion of the first substrate relative to a conductive portion of the second substrate;
determine a second variable capacitance based on the second resulting signal, wherein the second variable capacitance changes only in response to the vertical motion of the first substrate relative to the conductive portion of the second substrate; and
determine the lateral force in the first direction and the vertical force applied by an input object to the first substrate based on the first variable capacitance and the second variable capacitance.

12. The input device of claim 11, further comprising a third force electrode disposed on the first substrate, wherein the processing system is communicatively coupled to the third force electrode and further configured to:
receive a third resulting signal from the third force sensor electrode, the third resulting signal comprising the sensing signal driven onto the first force transmitter electrode;
determine a third variable capacitance based on the third resulting signal, wherein the third variable capacitance changes in response to lateral motion in a second direction and the vertical motion of the first substrate relative to the conductive portion of the second substrate; and
determine the lateral force in the second direction applied by the input object to the first substrate based on the second and third variable capacitances.

13. The input device of claim 11, wherein the conductive portion of the second substrate comprises an interior non-conductive region.

14. The input device of claim 13, wherein the interior non-conductive portion partially overlaps at least one of the first force sensor electrode and the third force sensor electrode.

15. The input device of claim 11, further comprising a third force sensor electrode and a second force transmitter electrode disposed on the first substrate, wherein the processing system is communicatively coupled to the third force sensor electrode and the second force transmitter electrode and further configured to:
drive a sensing signal onto the second force transmitter electrode;

receive a third resulting signal from the third force sensor electrode, the third resulting signal comprising effect of the sensing signal driven onto the second force transmitter electrode;

determine a third variable capacitance based on the third resulting signal, wherein the third variable capacitance changes in response to rotational motion and vertical motion of the first substrate relative to a second conductive portion of the second substrate; and determine a rotational force applied by an input object to the first substrate based on the second variable capacitance and the third variable capacitance.

16. A processing system for an input device, the input device comprising a plurality of sensor electrodes disposed on a first substrate, a second substrate mechanically coupled to the first substrate and configured to move laterally and vertically with respect to the first substrate, a first force sensor electrode, a second force sensor electrode, and a first force transmitter electrode disposed on the first substrate, the processing system comprising:

a sensor module comprising sensor circuitry, the sensor module configured to:
operate the plurality of sensor electrodes disposed on the first substrate to capacitively detect input objects in a sensing region of the input device;
transmit a sensing signal onto the first force transmitter electrode;
receive a first resulting signal from the first force sensor electrode, the first resulting signal comprising effects of the sensing signal transmitted onto the first force transmitter electrode; and
receive a second resulting signal from the second force sensor electrode, the second resulting signal comprising effects of the sensing signal transmitted onto the first force transmitter electrode; and wherein the processing system is configured to:
determine positional information for the input objects in the sensing region of the input device;
determine a first variable capacitance based on the first resulting signal, wherein the first variable capacitance changes in response to lateral motion in a first direction and vertical motion of the first force sensor electrode relative to a first conductive portion of the second substrate;
determine a second variable capacitance based on the second resulting signal, wherein the second variable capacitance changes in response to only vertical motion of the second force sensor electrode relative to the first conductive portion of the second substrate; and
determine a lateral force applied in the first direction and vertical force applied to the second substrate by the input objects based on the first variable capacitance and the second variable capacitance.

17. The processing system of claim 16, wherein the sensor module is further configured to:
transmit the sensing signal onto a second force transmitter electrode, the second force transmitter electrode disposed on the first substrate;
receive a third resulting signal from a third force sensor electrode, the third force sensor electrode disposed on the first substrate, the third resulting signal comprising effects of the sensing signal transmitted onto the second force transmitter electrode; and
receive a fourth resulting signal from a fourth force sensor electrode, the fourth force sensor electrode disposed on the first substrate, the fourth resulting signal comprising effects of the sensing signal transmitted onto the second force transmitter electrode;

and the processing system is further configured to:
determine a third variable capacitance based on the third resulting signal, wherein the third variable capacitance changes in response to lateral motion in a second direction, orthogonal to the lateral motion in the first direction and vertical motion of the third force sensor electrode relative to a second conductive portion of the second substrate;
determine a fourth variable capacitance based on the fourth resulting signal, wherein the fourth variable capacitance change in response to only vertical motion of the fourth sensor electrode relative to the second conductive portion of the second substrate; and
determine a lateral force applied in the second direction and vertical force applied to the second substrate by input objects based on the first variable capacitance, the second variable capacitance, the third variable capacitance, and the fourth variable capacitance.

18. The processing system of claim 17, wherein the first conductive portion and the second conductive portion comprise an interior non-conductive region.

19. The processing system of claim 18, wherein the first variable capacitance changes in response to a change in an area of overlap between the first force sensor electrode and the non-conductive region of the first conductive portion and the third variable capacitance changes in response to a change in an area of overlap between the third force sensor electrode and the non-conductive region of the second conductive portion.

20. The processing system of claim 17, wherein the processing system is further configured to:
determine a rotational force applied to the first substrate by input objects based on the first resulting signals, the second resulting signals, the third resulting signals and the fourth resulting signals.

* * * * *